Dec. 13, 1938.  H. H. OSBORN  2,139,908
TIMER
Filed Oct. 3, 1935   2 Sheets-Sheet 1
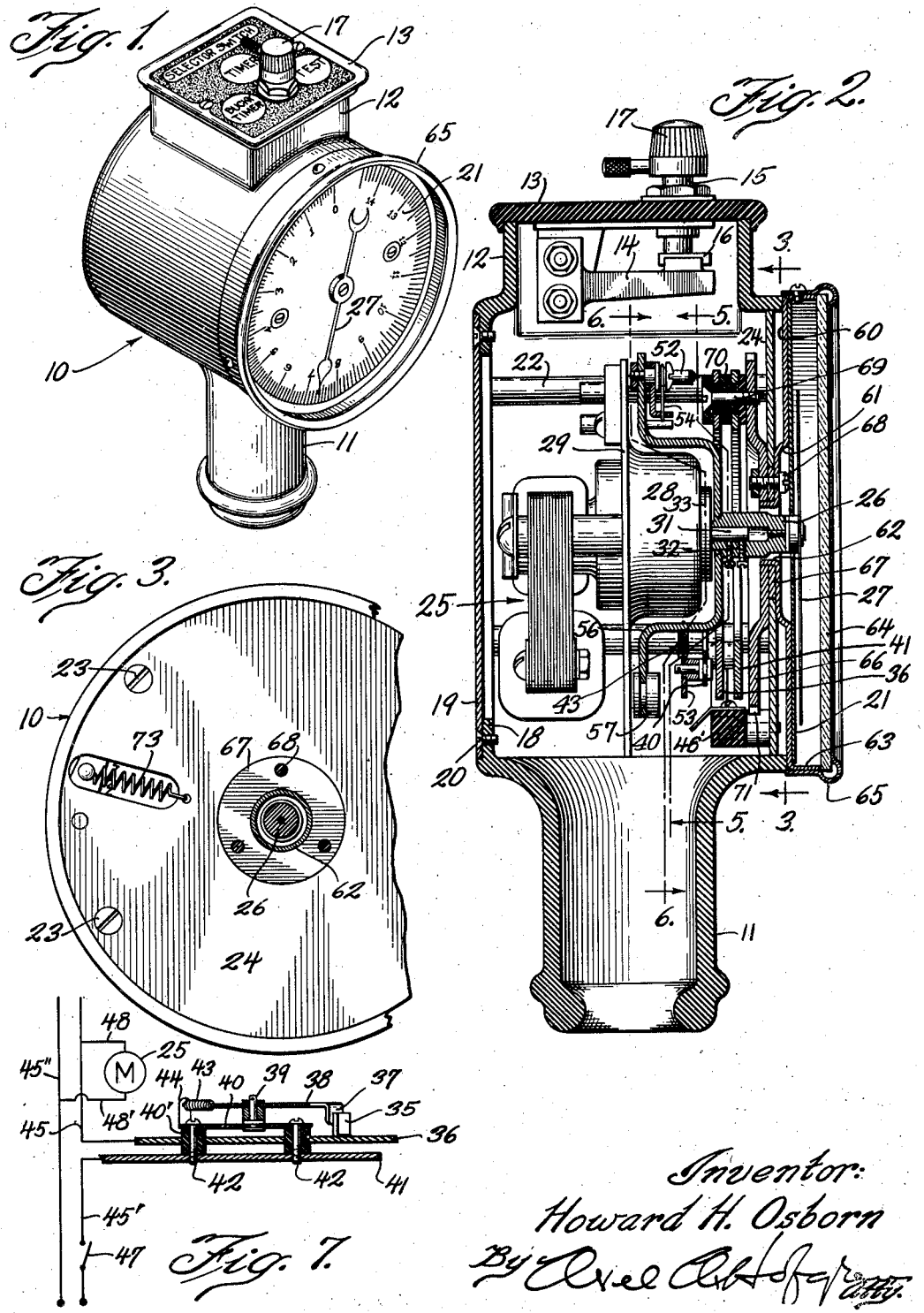
Inventor:
Howard H. Osborn Dec. 13, 1938.  H. H. OSBORN  2,139,908
TIMER
Filed Oct. 3, 1935  2 Sheets-Sheet 2
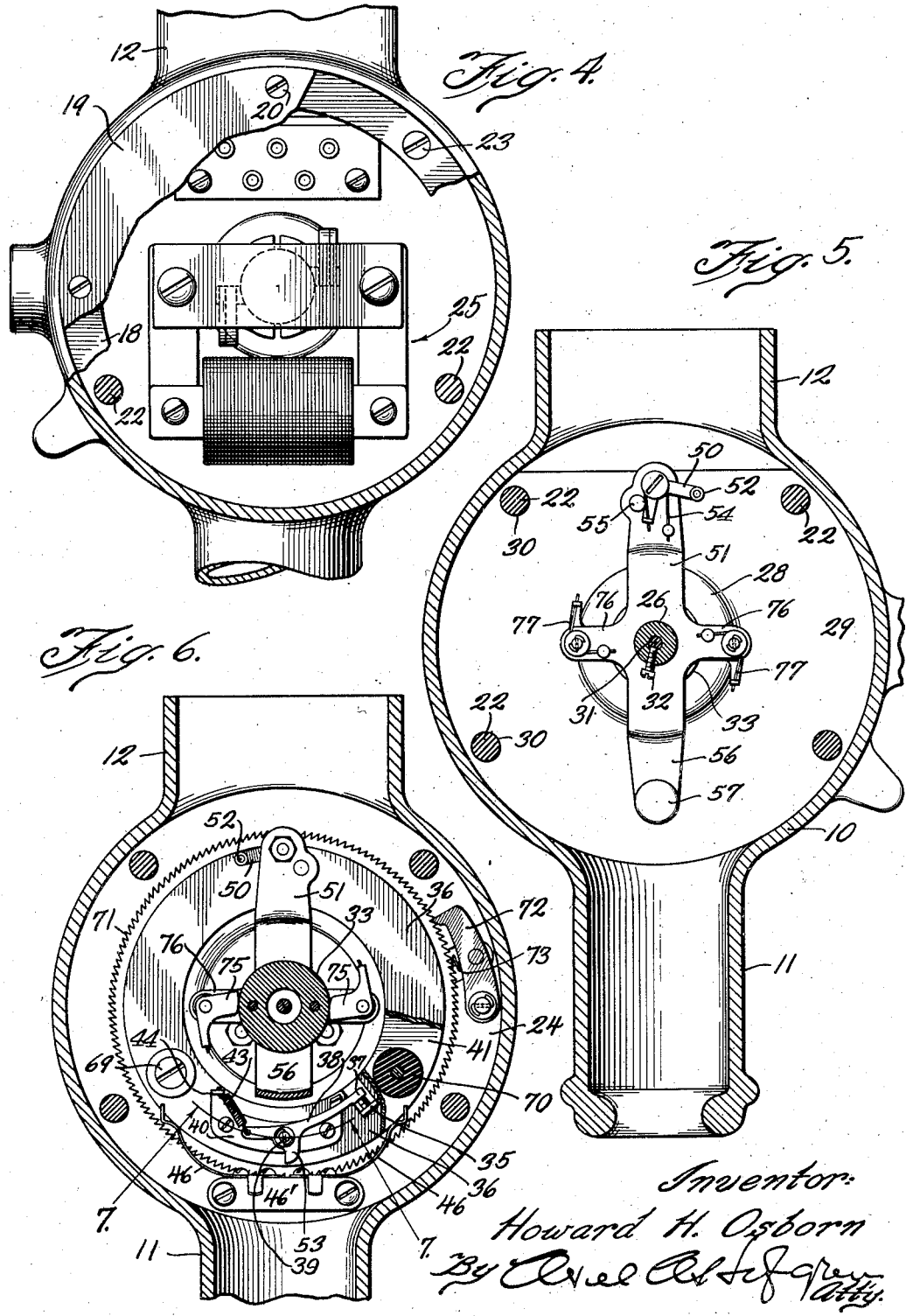
Inventor:
Howard H. Osborn Patented Dec. 13, 1938

2,139,908

UNITED STATES PATENT OFFICE 2,139,908

TIMER

Howard H. Osborn, Chicago, Ill., assignor to H. G. Fischer & Co., Inc., Chicago, Ill., a corporation of Illinois Application October 3, 1935, Serial No. 43,379

14 Claims. (Cl. 200—38)

The invention relates generally to timers and more particularly to synchronous motor driven timers adapted for timing the operating period of electrically controlled apparatus.

An object of the invention is to provide a novel and improved synchronous motor driven timer which is readily set to the predetermined period, which accurately limits the period and which prevents re-initiation of the apparatus being timed until the timer is deliberately reset.

Another object of the invention is to provide a synchronous motor driven timer operable to interrupt the timer motor circuit as well as the circuit of the apparatus being controlled upon the expiration of the period for which the timer was set.

Yet another object is to provide a timer of the character described having a dial rotatable relative to the timer casing and to the pointer for setting the timer.

A further object is to provide a timer of the character described having one way clutch means permitting forward rotation of the pointer but prohibiting reverse rotation to prevent improper reenergization of the controlled machine after interruption thereof.

Yet a further object is to provide a timer having a synchronous motor driven shaft carrying an indicating pointer and a switch operating arm, and means supporting a dial and a switch both rotatable relative to said shaft for the purpose of setting said timer.

Still a further object is to provide an operating period control for an apparatus including a synchronous motor driven timer and a manual switch exercising joint control, the manual switch governing initiation of operation of both the apparatus and the timer and interruption thereof prior to completion of the operating period for which the timer is set but incapable of extending operation beyond the period.

Other objects and advantages will become apparent from the following detailed description taken in connection with the accompanying drawings, in which:

Fig. 1 is a perspective view of a timer embodying the features of this invention.

Fig. 2 is a longitudinal vertical sectional view of the timer shown in Fig. 1.

Fig. 3 is a fragmentary view taken approximately along line 3—3 of Fig. 2.

Fig. 4 is a rear view of the timer with portions of the cover and casing broken away better to reveal the construction.

Fig. 5 is a view taken approximately along line 5—5 of Fig. 2.

Fig. 6 is a view taken approximately along line 6—6 of Fig. 2.

Fig. 7 is a fragmentary view taken along line 7—7 of Fig. 6, and diagrammatically showing a circuit connection of the timer.

Although I have illustrated in the drawings and shall herein describe in detail a preferred embodiment of the invention, it is to be understood that I do not thereby intend to limit the invention to the specific form disclosed but aim to cover all modifications and alternative constructions falling within the spirit and scope of the invention as defined by the appended claims.

As illustrated in the drawings, the invention is embodied in a timer comprising a generally cylindrical casing 10 having a depending tubular portion 11 for reception of leads and a rectangular portion 12 at its top. This rectangular portion is closed by a cover 13 of insulating material and houses switch mechanism generally designated 14. A shaft 15 projects through the cover 13 and at its inner end carries operating means 16 for the switch mechanism and at its outer end carries a knurled actuating knob 17 having three operative positions as best seen in Fig. 1. The switch mechanism is more particularly disclosed and claimed in an application of Herman G. Fischer, for Control apparatus, Serial No. 74,665, filed April 16, 1936, which includes a timer of the character here described.

While the timer is not limited as to the type of machine or apparatus that it can control, it will, for purposes of disclosure only, be described hereinafter as adapted for controlling the exposure period of an X-ray machine, for which it is particularly well adapted. The casing 10 is formed at its rear end with an inwardly projecting flange 18 and is closed by a cover 19 removably secured by screws 20 to afford convenient access to the interior of the casing. The front end of the casing is provided with a dial 21 bearing graduations representing seconds and tenths of seconds. Herein the numerals opposite the graduations representing seconds are consecutively arranged in a counterclockwise direction around the dial. Secured at one end to the flange 18 and extending longitudinally of the casing are a plurality of posts 22. At the other end, the posts 22 are secured to an annular disk 24 fitting removably within the casing and with the posts 22 forming a supporting framework. Preferably the posts are secured to the flange and to the disk by screws 23 so as to be readily separable.

Housed within the casing and mounted on the supporting framework is the timing mechanism proper. It comprises a self-starting, synchronous electric motor 25 driving through suitable gearing a shaft 26 extending outwardly through the dial 21 and carrying on its projecting end a pointer 27. The gearing interposed between the motor 25 and the shaft 26 is such that the pointer 27 will rotate through an angle represented by one of the major graduations on the dial 21 in one second, and rotates in a clockwise direction, as viewed in Fig. 1. A fluid-tight, oil-filled housing 28 encloses the gearing so that it is constantly immersed, and the housing is formed with a disk-like flange 29 for supporting the gearing and the motor. The flange 29 fits slidably within the casing and is provided with apertures 30 through which the posts 22 project. In order that it may be removed without removing the motor and gear housing, shaft 26 preferably is slidably received on a stub shaft 31 projecting from the housing 28. The shaft 26 is secured against rotation relative to the stub shaft 31 by means of set screws 32, the shaft 31 being provided with a flattened surface for that purpose, as best seen in Fig. 5. For a purpose hereinafter to be described, the housing 28 is provided with an annular drum surface 33 concentric with the shaft 26.

Operation of the timer to control the exposure period of an X-ray or other machine is through a switch, normally closing a control circuit for the machine when the same is in operation and interrupting the circuit to stop the operation of the machine when the predetermined exposure period has elapsed. Herein the switch comprises a contact 35 projecting from a collector ring 36 and a contact 37 forming the end of a switch member 38. This member is pivotally mounted intermediate its ends on a fulcrum 39 projecting from a plate 40 supported by the collector ring 36 and a second collector ring 41. The switch member 38 is insulated from the collector ring 36 by sleeves 40', as best seen in Fig. 7, but is in electrical contact with the collector ring 41 by means of screws 42, the plate 40 and the fulcrum 39. The member 38 is urged to switch-closed position by means of a spring 43 connected between the free end of the member and a projection 44 on the plate 40.

As shown diagrammatically in Fig. 7, collector rings 36 and 41, and consequently the switch formed by contacts 35 and 37, are connected respectively to leads 45 and 45' of a control circuit leading to the machine with which the timer is to be employed. Actual connection is made through brushes 46 mounted on a terminal block 46' to which the leads are secured. The control circuit for the machine is completed by lead 45'', but the circuit also supplies energy for the motor 25 through leads 48 and 48' connecting the motor in parallel with the control means. The switch is connected ahead of the motor and thus serves to control both the motor and the control means for the X-ray machine. In addition there is a manual switch 47 connected in series with the switch 35—37 and biased to open position. Thus control of the circuit is jointly under the timer and the manual switch 47. The latter controls the starting operation and may interrupt an operation before completion of the exposure period for which the timer is set, but is incapable of prolonging the operation beyond the predetermined period.

Cooperating with the switch member 38 is a switch actuating member 50. These members are relatively rotatable and are adapted manually to be spaced angularly through a varying number of degrees to set the timer for different exposure periods. In the present instance the switch member 38 is stationary when the timer is in operation, while the switch actuating member 50 is rotated by the synchronous motor 25. To that end the member 50 is pivotally mounted on the end of an arm 51 rigid with the shaft 26 and carries a roller 52 at one end projecting at right angles thereto. The roller is adapted to engage a finger 53 on the switch member 38, when the predetermined exposure period has elapsed, to pivot the member 38 and thereby open the switch. A coiled spring 54 tends to swing the member 50 into engagement with a stop 55, but permits the roller 52 to ride up on the finger 53 upon engagement therewith, to avoid injury to the mechanism. Disposed diametrically opposite the arm 51 is an arm 56 carrying a weight 57 to counterbalance the arm 51 and the switch actuating member 50.

Herein setting of the timer is effected by manually adjusting the switch angularly with respect to the switch actuating member 50. To facilitate such setting regardless of the length of the period or the length of the previous period, the switch 35—37 and the dial 21 are formed as a unit rotatable relative to the casing 10, the shaft 26 and the pointer 27 and arm 51 carried thereby. For that purpose, the dial 21 is mounted on a backing plate 60 offset inwardly at 61 and having an inturned flange 62 projecting through the opening in the plate 24. At its outer circumference the backing plate 60 is formed with a flange 63 for spacing from the dial 21 a glass face 64 secured on the backing plate by means of an annular ring 65.

Disposed on the inside of the plate 24 and offset toward the plate is a disk 66 centrally apertured to receive the flange 62 on the plate 60. Interposed between the offset portions of the plate 60 and the disk 66, and between the flange 62 and the plate 24, is a washer 67 serving to space the plate 60 and the disk 66 apart so that they may be secured together by bolts 68 without clamping the plate 24 rigidly therebetween. The disk 66 constitutes a support for the collector rings 36 and 41 and the switch 35—37 mounted thereon, the rings being secured to the disk 66 by means of screws 69. Suitable blocks of insulation 70 are employed for supporting the collector rings in spaced insulated relation to one another and to the disk 66. It will thus be seen that the switch, the collector rings and the dial are rotatably supported by the plate 24 for angular adjustment relative to the casing and to the pointer 27 and the arm 51.

Setting of the timer is thus effected by rotation of the dial and switch unit, and in the present instance this rotation is clockwise as viewed in Fig. 1. To facilitate accurate setting to tenths of a second, and to retain the mechanism in set position, the disk 66 is formed with ratchet teeth 71 each corresponding to the graduations on the dial representing one-tenth of a second. Cooperating with the ratchet teeth 71 is a pawl 72 pivotally mounted on the plate 24 and urged into engagement with the teeth by means of a tension spring 73.

As previously stated, the switch 35—37 governs the timer motor circuit, as well as the X-ray machine control circuit, to arrest the motor upon opening of the switch by engagement of the roller 52 with the finger 53 on the switch member 38. In order that the spring 43 may not cause reverse rotation of the arm 51 and thus permit the switch member 38 to pivot and close the switch, clutch means is provided for preventing such reverse rotation of the arm 51. Such clutch means comprises clutch elements 75 pivotally mounted on arms 76 extending at right angles to the arms 51 and 56. These clutch elements engage the drum surface 33 and are yieldably urged into such engagement by means of coiled springs 77. The clutch elements are so mounted relative to the drum 33 that clockwise rotation of the shaft 26 tends to swing the elements out of frictional engagement against the action of the springs 77 while counterclockwise rotation tends to swing the elements into frictional gripping relation to the drum and thus prevent rotation.

It is believed apparent from the foregoing that the pointer 27, the roller 52 of the switch actuating member, the finger 53 of the switch member 38, and the zero point of the dial 21 are disposed relative to one another so that the switch is opened and the synchronous motor, as well as the X-ray machine, is stopped when the pointer is opposite zero on the dial. In view of the fact that the switch serves to arrest the motor 25, the pointer 27 will remain opposite zero so that the timer is always easily reset for any predetermined time interval by merely rotating the dial clockwise until the numeral representing seconds of operation is opposite the pointer 27. By such clockwise rotation the switch 35—37 likewise is rotated relative to the switch actuating member 50 so that the latter must be driven through the same angle before it again contacts the switch member 38 to open the switch. The pointer indicates at all times the number of seconds still remaining in the period for which the timer was set.

Operation of the timer briefly is as follows: With the timer at rest the pointer 27 will be opposite zero on the dial and roller 52 will be engaging finger 53 to open switch 35—37. If the exposure period is to be 7.3 seconds, the attendant simply rotates the dial clockwise until 7.3 is opposite the pointer, as shown in Fig. 1. As previously described, this will rotate the switch 35—37 through a corresponding angle away from roller 52 and will permit spring 43 to close contacts 35—37. This places the circuit completely under the control of the manual switch 47. Closure of the switch by the attendant will thus initiate operation of both the X-ray machine and the timer motor.

Should the attendant desire to stop the machine before the completion of the exposure period for which the timer has been set, he need only release the switch 47. Thereafter he may again close switch 47 to permit operation of the machine for the remainder of the exposure period or he may reset the timer. Such resetting is simply done by rotating the dial until the desired figure is opposite the pointer 27, and it is immaterial that the previous period was not completed.

Under normal operation, the attendant will hold the switch 47 closed until the period has elapsed. At such time the roller 52 will strike finger 53 to open switch 35—37 and stop both the motor 25 and the X-ray machine even though switch 47 is closed. Due to the stopping of the motor 25, the switch 35—37 is held open until the timer is reset so that accidental closing of switch 47 will not start the X-ray machine. Thus it is seen that I have provided a timer which positively prevents over exposure and which is readily set regardless of what occurred in the previous period.

I claim as my invention:

1. A timer comprising a casing, a synchronous motor, a shaft driven by said motor, a pointer fast on said shaft, a switch member, a switch actuating member, and a dial rotatable manually relative to said casing and said shaft, one of said members being mounted for rotation with said dial and the other of said members being mounted for rotation with said shaft.

2. A timer comprising a casing, a synchronous motor, a shaft driven by said motor, an indicating pointer fast on the shaft, a switch member, a switch actuating member, a graduated dial bearing numerals representing time intervals rotatably mounted relative to said casing and said shaft, one of said members being mounted for rotation with said dial and the other of said members being mounted for rotation with said shaft and being disposed respectively relative to said dial and to the pointer carried by said shaft so as to engage when the pointer is opposite the zero position of the dial.

3. A timer comprising a casing, a synchronous electric motor, a shaft driven by said motor, a pointer fast on said shaft, a switch actuating member also fast on said shaft, a dial rotatable manually relative to said casing and said shaft in the same direction as said shaft rotates, a switch mounted for rotation with said dial and disposed to be actuated by said actuating member, and numerals on said dial indicating time intervals and arranged consecutively in a direction counter to the direction of rotation of said dial.

4. A timer comprising a synchronous motor, a shaft driven by the motor, an indicating pointer and a switch operating arm fast on the shaft, and a dial angularly adjustable about the shaft and carrying a switch disposed to be operated by said arm.

5. A timer comprising a casing, a synchronous motor, a shaft driven by said motor, a pointer carried by said shaft, a switch actuating member also carried by said shaft, and a unitary structure including a dial and a switch rotatably mounted relative to said casing and said shaft.

6. A timer comprising a synchronous motor, a shaft driven by the motor, an indicating pointer and a switch operating arm fast on the shaft and a dial angularly adjustable about the shaft and carrying a ratchet wheel, a pair of collector rings, and a switch electrically connected intermediate the collector rings disengageable by said arm.

7. A timer comprising a casing, a synchronous motor, a shaft driven by the motor, an indicating pointer and a switch actuating arm fast on said shaft, a dial angularly adjustable relative to said casing and said shaft, said dial being graduated to represent time intervals, a switch rotatable with said dial and disposed to be engaged by said actuating arm, a disk rotatable with said dial and having ratchet teeth corresponding to the graduations on said dial, and a pawl for engaging said teeth.

8. A timer comprising a casing, a supporting framework within said casing comprising an annular disk and posts supporting the disk extending longitudinally of the casing, a synchronous motor, a shaft driven by said motor, gearing interposed between said motor and said shaft, a housing enclosing said gearing and connected to said framework to support said shaft and motor, an indicating pointer rigid with said shaft, an arm also rigid with said shaft and having mounted on the end thereof a switch actuating member, a dial, a backing plate therefor disposed outwardly of said annular disk, a disk secured to said backing plate with said annular disk secured slidably therebetween to permit rotation of said dial relative to the casing and to the shaft, a pair of collector rings secured to said second-named disk, and a switch carried by said collector rings and electrically interposed therebetween, said switch including a pivotally mounted switch member adapted to be engaged by said switch actuating member upon rotation of said shaft.

9. A timer comprising a switch member normally urged to switch-closed position, a switch actuating member operable upon engagement with said switch member to open the switch, one of said members being manually movable relative to the other to set the timer, timing mechanism for driving the other of said members, and friction clutch means preventing rearward movement of said driven member.

10. A timer comprising a switch member normally urged to switch-closed position, a switch actuating member operable upon engagement with said switch member to open the switch, one of said members being manually movable relative to the other to set the timer, timing mechanism for driving the other of said members, a stationary drum, and a pair of friction clutch elements rotatable with the driven member for engaging said drum to permit rotation of the driven member in a forward direction but preventing rotation in a reverse direction.

11. A timer comprising a casing and timing mechanism including a graduated dial rotatable relative to the casing and a pointer rotatable relative to the casing, said dial and pointer being relatively rotatable during both the setting of the timer and the operation thereof.

12. A timer comprising a casing and timing mechanism including a graduated dial rotatable relative to the casing and a pointer rotatable relative to the casing, said dial and pointer being relatively rotatable during both the timer setting operation and the running operation, and said dial being stationary during one of the operations.

13. A timer comprising a casing, timing mechanism within the casing including a rotatable main shaft and electrical circuit control means, a pointer fixed on the shaft to be rotatable therewith, and means including a dial rotatable relative to the casing and the shaft for setting the timing mechanism, component parts of the circuit control means being mounted to rotate with said shaft and said dial.

14. A timer comprising a casing, timing mechanism within the casing including a rotatable main shaft, a synchronous electric motor for driving the same, means including a dial rotatable relative to the casing for setting the timing mechanism, said dial being stationary during the operation of the timing mechanism, and a pointer fixed on said shaft to be rotatable therewith and relative to the dial during the operation of the timing mechanism and indicating the time remaining in the operating period.

HOWARD H. OSBORN.